United States Patent [19]

Lee

[11] Patent Number: 5,309,639
[45] Date of Patent: May 10, 1994

[54] METHOD OF MAKING A MACHINE COMPONENT WITH LUBRICATED WEAR SURFACE

[75] Inventor: Peter W. Lee, Canton, Ohio

[73] Assignee: The Timken Company, Canton, Ohio

[21] Appl. No.: 979,902

[22] Filed: Nov. 23, 1992

[51] Int. Cl.⁵ .................. B22F 3/24; B23P 13/02; F16C 33/64
[52] U.S. Cl. .................. 29/898.13; 29/558; 29/898.02; 29/898.066; 29/898.1; 51/291; 204/129.35; 419/27; 419/28; 384/902
[58] Field of Search ............. 29/557, 558, 898.02, 29/898.056, 898.058, 898.066, 898.1, 898.13; 204/129.1, 129.35, 129.5; 419/26, 28; 384/902; 51/290, 291

[56] References Cited

U.S. PATENT DOCUMENTS

| | | | |
|---|---|---|---|
| 3,852,045 | 12/1974 | Wheeler et al. | 428/566 |
| 4,571,097 | 2/1986 | Lee et al. | 384/571 X |
| 4,601,592 | 7/1986 | Jatczak et al. | 384/571 X |
| 4,720,199 | 1/1988 | Geczy et al. | 175/107 X |
| 4,735,678 | 4/1988 | Mandigo et al. | 204/129.5 X |

Primary Examiner—Mark Rosenbaum
Assistant Examiner—S. Thomas Hughes
Attorney, Agent, or Firm—Polster, Lieder, Woodruff & Lucchesi

[57] ABSTRACT

A machine component has a wear surface along which excessive friction will develop unless the surface receives adequate lubrication. To provide lubrication for the wear surface in the absence of any other lubricating medium, the component is formed from powdered metal compacted to less than theoretical density so as to contain pores, and the pores hold oil. Even though the component is mechanically machined along its wear surface, the pores are nevertheless open at the wear surface to enable the entrapped oil to exude from the ring and lubricate that surface. During manufacture of the ring, the mechanical machining creates a Bielby layer at the wear surface, that is it smears the metal and closes the pores at that surface, but the Bielby layer is removed by electro-discharge machining This procedure erodes the Bielby layer with electrical arcs so that the pores at the wear surface are again exposed and open.

18 Claims, 1 Drawing Sheet

METHOD OF MAKING A MACHINE COMPONENT WITH LUBRICATED WEAR SURFACE

BACKGROUND OF THE INVENTION

This invention relates in general to a part or machine component having a lubricated wear surface and, more particularly, to a process for providing a powdered metal machine component with a lubricated wear surface, to the machine component itself, and to a bearing having such a component.

Powdered metal machine components are rarely compacted to theoretical density, which is of course the density of the wrought metal, and as a consequence such components contain pores. Where the component carries a wear surface against which another component moves, these pores serve a very useful purpose in that they will hold a liquid lubricant and release it at the wear surface so as to minimize friction between the wear surface and the other component. Indeed, the pores may serve as a lubricant reservoir capable of supplying lubrication to the wear surface in the event the wear surface looses its normal supply of lubrication.

U.S. Pat. No. 4,601,592, granted to The Timken Company on Jul. 22, 1986, discloses a tapered roller bearing having a rib ring which is formed from powdered steel. This rib ring provides a wear surface along which the large ends of the tapered rollers move, thus preventing the rollers from being expelled from the space they occupy between the two races of the bearing. The ring holds a lubricant in its pores, and those pores are open and exposed at the wear surface. Should the bearing lose its normal supply of lubrication, the ring will release its lubricant to the wear surface and prevent failure of the bearing at this critical surface.

A powdered metal part, however, requires special preparation before its pores will release a stored lubricant at a wear surface on the part. This derives from the fact that the compaction of powdered metal into the shape desired for the part and the subsequent sintering to retain that shape does not proceed with the precision required for many parts. As a consequence, the compacted and sintered part must undergo further mechanical machining, such as grinding, to bring it to the dimensions, shape and surface finish suitable for service. The machining obliterates and closes the pores, producing a so-called "Bielby layer" which is undesirable at the wear surface, since it prevents a lubricant within the ring from being released at that surface.

U.S. Pat. No. 4,601,592 addresses this problem by recommending that the powdered metal part be chemically etched along its wear surface. This eliminates the Bielby layer and opens the pores at the wear surface so that a lubricant may be introduced into the wear ring and likewise pass out of the wear ring at the wear surface when needed. But the etchant used to remove the Bielby layer also enters the pores where it is difficult to remove and more significantly causes unwanted corrosion. Indeed, the etchant together with the grinding fluid, which is primarily water and is likewise absorbed into the pores during grinding, produces a particularly corrosive combination.

Impregnating the pores with oil before the grind would keep out most of the grinding fluid and afterwards the etchant as well, but oil inhibits etching and is likely to cause an uneven etch. Thus, the pores are kept free of oil, at least until completion of the etching.

The present invention resides in a process for removing the Bielby layer from a powdered metal machine component by subjecting the component to erosion at the surface areas where the Bielby layer is to be eliminated, preferably erosion by electro-discharge machining. The process is particularly useful for providing a powdered metal machine component, which has been mechanically machined, with wear surface against which another machine element moves, in that the pores of the powdered metal component are open at the wear surface and thus can release lubricant which is stored in the pores, so that the other element moves along the wear surface with minimal friction. The invention also resides in a machine component having a wear surface formed by the process and that component may be a rib for guiding and confining rolling elements of an antifriction bearing. Indeed, the invention further resides in a bearing having such a rib.

DESCRIPTION OF THE DRAWINGS

In the accompanying drawings which form part of the specification and wherein like numerals and letters refer to like parts wherever they occur —

DETAILED DESCRIPTION

Figure 1:
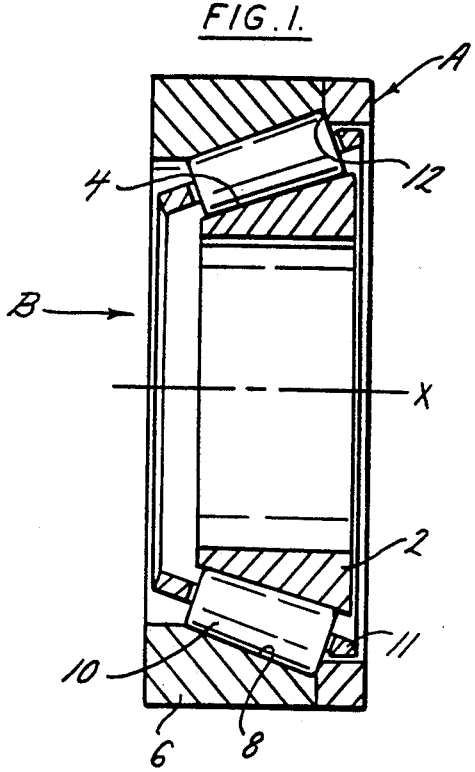
FIG. 1 is a cross-sectional view of a tapered roller bearing provided with a powdered metal rib ring having a wear surface which is eroded in accordance with the present invention.
Figure 2:
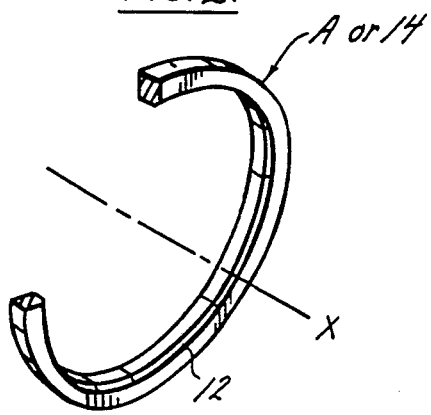
FIG. 2 is a perspective view, partially broken away and in section, of ring.

Referring now to the drawings, a metal ring A (FIG. 2) exists in an antifriction bearing B (FIG. 1) where the bearing B experiences its greatest friction. The ring A, which is formed from a powdered metal containing pores, holds a liquid lubricant which it releases in the event that the bearing B loses its normal supply of lubrication. The ring A is mechanically machined to give it the proper dimensions and configuration as well as surface finish, and during this machining the pores at the machined surfaces are obliterated and to large measure closed, producing a so-called Bielby layer. But subsequent processing erodes the Bielby layer at critical surfaces and thus opens the pores at these surfaces, all without subjecting the ring A to corrosive substances. While the ring A represents a typical powdered metal part having a wear surface along which excessive friction may develop in the absence of proper lubrication, it is not the only application where the process finds utility. Generally speaking, the process is useful wherever a raceway, slideway or other type of working or wear surface must be provided on a powdered metal machine component and indeed it has utility wherever one must for some reason eliminate a Bielby layer from a powdered metal part. Since the rib ring A of the tapered roller bearing B represents a typical and perhaps the most pertinent example, the discussion will proceed in the context of the bearing B and its ring A.

The bearing B, which establishes an axis of rotation X, includes (FIG. 1) an inner race or cone 2 having a tapered raceway 4 which is presented outwardly and an outer race or cup 6 having a tapered raceway 8 which is presented inwardly toward the raceway 4 of the cone 2. The two raceways 4 and 8 are on apex, meaning that if extended to their respective apicies, those apecies would lie at a common point along the axis X of rotation. In addition, the bearing B includes a set of tapered rollers 10 arranged in a single row between the two raceways 4 and 8. Essentially, line contact exists between the tapered side faces of the rollers 10 and the raceways 4 and 8 of the cone 2 and cup 6, respectively. Finally, the bearing B has a cage 11 which maintains the proper spacing between the rollers 10.

As with any tapered roller bearing, the geometry of the bearing B is such that a radial load transmitted through the rollers 10 from the cone 2 to the cup 6 or vice versa translates into a slight axial force on the rollers 10, and that force would expel the rollers 10 from the space between the two raceways 4 and 8 were it not for the rib ring A which is clamped against the front face of the cup 6, that is the face out of which the large end of the raceway 8 opens. The rib ring A projects inwardly past the large diameter end of the cup raceway 8, and here it is provided with a working or wear surface 12 against which the large ends of the rollers 10 bear.

In the operation of the bearing B the cone 2 rotates within the cup 6 or the cup 6 rotates around the cone 2, but in either event the rollers 10 roll along the raceways 4 and 8, generating relatively little friction at the raceways 4 and 8 by reason of the rolling contact. But the large end faces of the rollers 10 partially slide or slip along the wear surface 12 of the rib ring A and thus have the potential of generating considerably more friction at the surface 12. Normally, the rollers 10 operate in the presence of a lubricating medium, such as oil, and indeed inherently pump the lubricant up the tapers of the raceways 4 and 8 toward the rib ring A. Thus, during the normal operation of the bearing B, the wear surface 12 of the rib ring A receives adequate lubrication, and while some friction will exist, it is not enough to damage the rib ring A or excessively retard rotation.

The wear ring A is formed from powdered metal, preferably an alloy steel, which is compacted to between 70% and 85% theoretical density. Being less than theoretical density, the powdered metal of the ring A contains pores. Like the cone 2, cup 6 and rollers 10, the rib ring A is manufactured with considerable precision, and to achieve this precision it undergoes at least one mechanical machining operation. Indeed, the ring A and its wear surface 12 are formed to exacting specifications as to contour and angle, and this is achieved by subjecting the ring A to a grinding operation. Even though the grinding closes the pores of the powdered metal, they are thereafter opened at the wear surface 12. Should the bearing B lose its normal supply of lubrication, the lubricant in the rib ring A will emerge from the open pores at the wear surface 12 and for a reasonable duration supply adequate lubrication to the wear surface 12 so that neither the rib ring A nor the rollers 10 are damaged as the large end faces of the rollers 10 move along the wear surface 12.

The rib ring A derives from a powdered metal, preferably a powdered high strength, high temperature, bearing steel. The powdered steel is compressed into a compacted shape, actually a ring form 14 (FIG. 2), which is similar in configuration to the rib ring A, but is slightly larger in cross section. The compression should be sufficient to compact the steel powder to between 70% and 85% of maximum or theoretical density, that is to between 70% and 85% of the density of comparable wrought steel. This leaves the compacted shape or ring form 14 with pores throughout. The powder may contain a solid lubricant to enable it to flow more easily in the die where it is compressed into the ring form 14. After compaction, this solid lubricant is eliminated from the ring form 14 by heating the ring form 14 to between 1350° F. and 500° F.

Next the compacted ring form 14 is sintered by heating it within a vacuum or a reducing atmosphere to between 2000° F. and 2300° F. for at least 20 minutes. The sintering effects bonds between the grains or granules of steel and thereby imparts strength and rigidity to the ring form 14. The ring form 14 is cooled from this elevated temperature to about 1000° F. in a vacuum and then to room temperature in nitrogen gas. In other words, it undergoes a vacuum-gas quench.

Thereafter, the sintered ring form 14 is tempered. For the typical bearing steel, the sintered ring form 14 is heated to 360° F., held at that temperature for 30 minutes, and then cooled to room temperature. This improves the toughness and durability of the steel in the ring form 14.

Next the sintered and tempered ring form 14 is impregnated with a lubricant such as an oil. In this regard, the pores of the ring form 14 are essentially open at all surfaces of the ring form 14, even though the powdered metal may have undergone a very slight amount of smearing along the surfaces of the die cavity which gave shape to it. In any event, the sintered and tempered ring form 14 is placed in a vacuum to remove air from its pores and then immersed in the oil so that the oil enters the pores, completely filling them. To facilitate entry, the oil may be heated up to 300° F.

Next comes the mechanical machining. The sintered and oil-impregnated ring form 14 is now ground on all surfaces to give the final shape and dimensions to all of its surfaces, except the wear surface 12. That surface, while being ground, is left up to 0.002 inches large, but otherwise has its final shape and angle. The grinding occurs in the presence of a grinding fluid, which is for the most part water, but that fluid for all intents and purposes does not enter the pores, for the oil already occupies those pores. Thus, the grinding fluid does not remain with the ring form 14, where it might promote corrosion after completion of the grinding. Indeed, liberal amounts of grinding fluid may be used without adverse effects. Along each surface which is ground, the powdered metal of the sintered ring form 14 experiences some smearing with a resulting obliteration and closure of the pores at that surface, or in other words, the ring form 14 along its ground surfaces acquires a Bielby layer. This is of little significance and indeed even beneficial, except at the wear surface 12, for the pores must be open at that surface if the rib ring 14 is to release its oil and thereby prevent excessive friction from developing between the rollers 10 and the rib ring A.

Finally the ground ring form 14 is subjected to electro-discharge machining, more commonly referred to as "EDM", to open the pores along the wear surface 12. In effect, EDM erodes the Bielby layer at the wear surface 12 and thereby leaves the pores exposed and open along that surface. EDM is a known machining process used primarily to produce accurately shaped cavities in metal workpieces.

Figure 3:
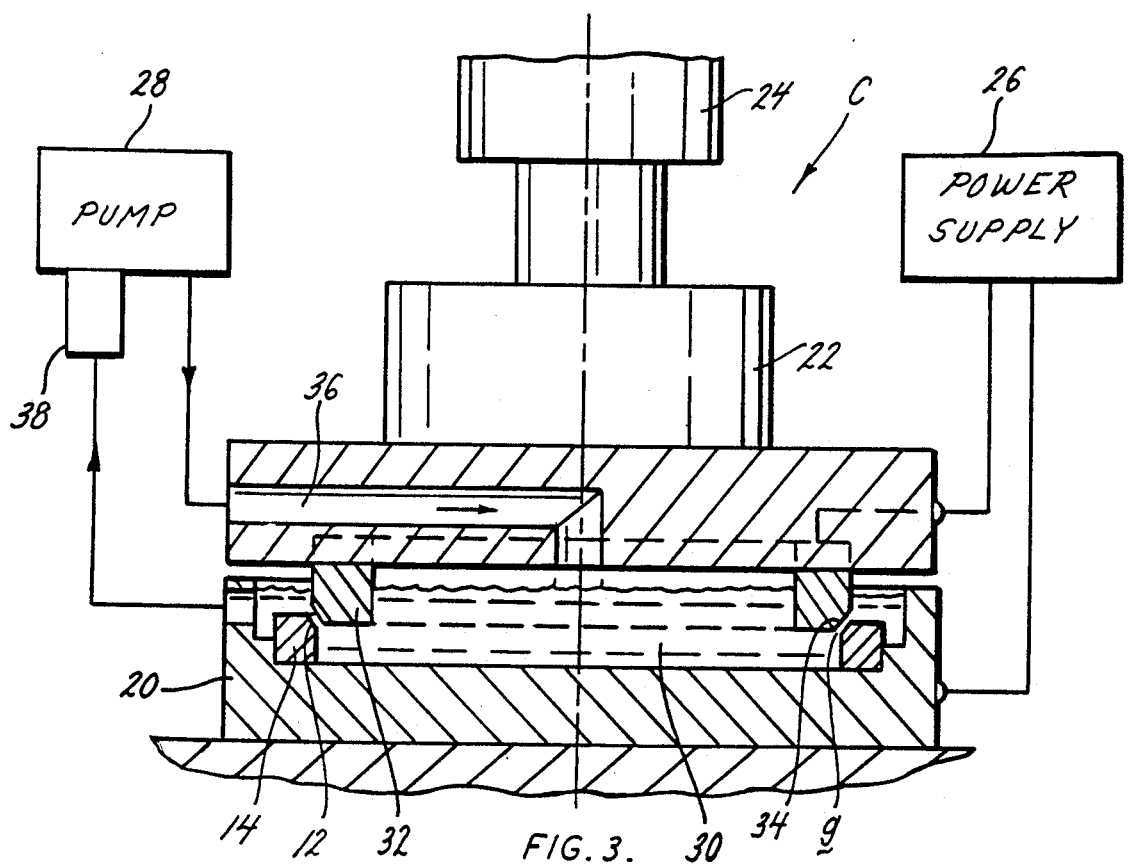
FIG. 3 schematic view of the equipment for eroding the rib ring at its wear surface to open the pores at that surface.

The electro-discharge machining requires an EDM machine or equipment C (FIG. 3) which basically includes a jig 20, a head 22 located above the jig 20, and a mechanism 24 for moving the head 22 toward and away from the jig 20. In addition, the equipment C includes an electrical power supply 26 and a coolant pump 28.

The jig 20 holds the rib ring 14 in a fixed position, and to this end is provided with a cavity 30 which receives the ring form 14 with its wear surface 12 presented upwardly. The cavity 30 also serves as a receptacle for a liquid coolant, and is deep enough to immerse the entire ring form 14— and particularly its wear surface 12— in the coolant. Actually, the coolant is a dielectric oil which has the capacity to ionize and conduct electrical current. The jig 20 is formed from metal and establishes a good electrical contact with the machined ring form 14 so that electrical current will flow from one to the other.

The head 22 carries an electrode 32 which is circular, it being about the same diameter as the ring form 14. Indeed, one of its faces, that is its active face 34, conforms to the configuration desired for the wear surface 12 in that it represents a complement of the wear surface 12. In other words, the electrode 32 and the rib ring A, if brought together with their axes aligned, would mate along the active surface 34 of the former and the wear surface 12 of the latter. The electrode 32 is preferably formed from copper-tungsten, but it may be formed from other electrically conductive materials, such as copper, brass or graphite. In addition, the head 22 includes a coolant channel 36 which opens downwardly within the confines of the circular electrode 32 for discharging the coolant into the jig 20 and the ring form 12 which rests in it. The mechanism 24 supports the head 22 above the jig 20 with the axis of its electrode 32 aligned with the axis of the ring form 14. It further moves the head 22 toward the jig 20 in small increments while maintaining the axis of the electrode 32 and ring form 12 perfectly aligned, and of course, will retract the head 22 from the jig 20 as well. Finally, the head 22 may contain a motor which rotates the electrode 32 slowly about the axis of the electrode 32.

The electrical power supply 26 is connected to the electrode 32 of the head 22 and to the jig 20 and has the capacity to impress electrical potential across the two. That potential, which delivers a direct current, pulsates between on and off conditions to produce a square wave form.

The pump 28 simply circulates the liquid coolant through channel 36 in the head 22 and through the cavity 30 of the jig 20, introducing it into the former and withdrawing it from the latter. Actually, the coolant flows outwardly from the head 22 at the center of the electrode 32 and passes between the electrode 32 and the ring form 14 at the wear surface 12 on the latter. The pump 28 withdraws the coolant from the cavity 30 beyond the periphery of the ring form 14 to recirculate it. But before the coolant is recirculated it passes through a filter 38 which removes solid particles from it.

Those solid particles derive from the EDM process. In this regard, the mechanism 24 lowers the head 22 until a small gap g exists between the active face 34 of the circular electrode 32 and the wear surface 12 on the ring form 14. The pump 28 is energized to discharge coolant into the cavity 30 of the jig 20, and that coolant flows outwardly through the gap g between the electrode 32 and the ring form 14. At the same time the motor within the head 22 is activated to slowly rotate the electrode 32. Finally, the power supply 26 is energized, and it produces a pulsating electrical potential which is impressed across the gap g between the active face 34 on the electrode 32 and the wear surface 12 on the ring form 14. The electrical potential causes the dielectric oil, which forms the coolant, to break down and ionize, and as a consequence an electrical current flows between the electrode 32 and ring form 14. Actually, an arc develops between the active face 34 and the wear surface 12 in the region of least resistance between the two, and the arc causes the metal along the wear surface 12 to melt and separate from the ring form 14. Once separated the molten metal solidifies in the oil to form a minute nodule. With each pulse another arc develops to melt part of the ring form 14 at the wear surface 12 and thereby produce another nodule. The arcs of course develop at the regions of least resistance between the active face 34 of the electrode 32 and the wear surface 12 of the ring form 14 and that is normally at the highest point on the wear surface 12. Thus, the erosion of the surface 12 caused by the close succession of arcs is of a uniform character, and this uniformity is further enhanced by the slow rotation of the electrode 32. The coolant which flows through the gap g between the electrode 32 and the ring form 14 immediately washes the nodules away so that they do not disrupt future arcs. The filter 38 collects the minute nodules before they pass into the pump 28.

The electrical power supply 26 remains energized long enough to remove up to 0.002 inches of metal from the ring form 14, and that is enough to eliminate the Bielby layer and expose pores of the powdered metal ring form 14 at the wear surface 12. Hence, the EDM process represents the final step in converting the ring form 14 into the rib ring A. Since the rib ring A is already impregnated with oil, it is ready for service at this time without further processing.

In use, the ring form A forms a vital part of the bearing B in that it resists the axial force imparted to the rollers 10 and thereby positions the rollers axially in the annular space between the cone 2 and cup 6, preventing them from being expelled from that space. Normally, the bearing B has a supply of lubricant, which may be grease or, more likely, a lubricating oil, it being introduced into the space between the cone 2 and cup 6 at the small ends of the rollers 10. The rollers 10 pump the lubricant, whether it be grease or oil, up the tapers of the raceways 4 and 8 so that it flows onto the wear surface 12 of the rib ring A, thus preventing excessive friction from developing between that surface and the large end faces of the rollers 10. Should the normal supply of lubrication fail, the bearing B will still remain operative and will not experience any failure, at least for a reasonable duration, because the rib ring A will release the oil entrapped in it to the wear surface 12 and thus provide lubrication at this critical surface area of the bearing B. Since the Bielby layer remains on the other surfaces of the rib ring A, the only region at which the entrapped oil effectively exudes is along the wear surface 12— the surface where it is needed.

Where the bearing B operates at extremely high speeds, the rib ring A may also be used to pilot the cage 11 as disclosed in U.S. Pat. No. 4,601,592, and in that event the Bielby layer should also be removed from that surface of the rib ring A that lies along the cage 11.

This invention is intended to cover all changes and modifications of the example of the invention herein chosen for purposes of the disclosure which do not constitute departures from the spirit and scope of the invention.

What is claimed is:

1. A process for producing a powdered metal part provided with a working surface for positioning or guiding a machine element that moves along and against the surface, said process comprising: compacting powdered metal to leas than theoretical density so as to provide a shape having pores and a working surface; sintering the shape to bond the powdered metal and rigidify the shape; mechanically machining the sintered shape at its working surface, such that a Bielby layer develops which closes the pores at the working surface; eroding the shape at its working surface with electrical arcs to remove the Bielby layer and expose and open the pores a the working surface; and introducing a fluent lubricant into the pores after the shape is sintered.

2. The process according to claim 1 wherein the shape is eroded at its working surface by electro-discharge machining.

3. The process according to claim 2 wherein the fluent lubricant is introduced into the shape prior to the mechanical machining.

4. The process according to claim 3 wherein the mechanical machining is grinding.

5. The process according to claim 1 wherein the shape is mechanically machined on substantially all of its surfaces.

6. The process according to claim 1 wherein the step of eroding the shape at the working surface includes presenting the shape toward an electrode such that a gap exists between the electrode and the shape at the working surface on the shape, and impressing an electrical potential across the gap in pulses so as to produce a succession of arcs which melt the powdered metal shape at the working surface to dislodge nodules from it and thereby erode the shape at the working surface.

7. The process according to claim 6 wherein the step of eroding the shape at the working surface further comprises filling the gap with a dielectric liquid, and wherein the electrical potential ionizes the liquid so that the arcs pass through the liquid.

8. A process for producing a machine component having a wear surface thereon, said process comprising: compacting powdered metal into a shape having the wear surface and otherwise the general configuration desired for the machine component, the compaction being to less than 100% theoretical density so that the shape contains pores; mechanically machining the shape and thereby creating a Bielby layer which to a measure obliterates and closes the pores at the wear surface; impressing an electrical potential across a gap between an electrode and the shape at the wear surface thereon, with the potential being of a magnitude sufficient to generate arcs which pass between the electrode and wear surface and erode the shape at the wear surface so as to remove the Bielby layer, whereby the pores are exposed and open at the wear surface; and introducing a fluent lubricant into the pores, whereby the lubricant will reduce friction along the wear surface.

9. The process according to claim 8 and further comprising placing a dielectric liquid in the gap between the electrode and the shape such that the wear surface and the opposing face of the electrode are immersed in the liquid, whereby the arch pass through the liquid; wherein the arcs melt the metal at the wear surface to produce nodules; and wherein the liquid carries the nodules away from the wear surface and the opposing face of the electrode.

10. The process according to claim 9 wherein the fluent lubricant is introduced into the pores of the shape before the shape is mechanically machined.

11. The process according to claim 10 wherein the shape is mechanically machined on substantially all of its surfaces.

12. The process according to claim 10 wherein the wear surface is annular, and the electrode is circular and has its axis colinear with the axis of the wear surface.

13. The process according to claim 12 and further comprising causing relative rotation between the electrode and the shape as the electrical potential is impressed, with the rotation being about the common axis of the electrode and wear surface.

14. A process for producing an annular bearing component having a working surface along and against which the rolling elements of an antifriction bearing move when the bearing is in operation, said process comprising: compacting powdered metal into a ring form having the general configuration desired for the annular bearing component, whereby the ring form has a working surface, the compaction being to less than 100% theoretical density so that the ring form contains pores; thereafter sintering the ring form to establish bonds between the grains of the compacted powdered metal; thereafter mechanically machining the sintered ring form to create a Bielby layer which to a measure closes the pores at the working surface; and eroding the machined ring form along its working surface by establishing electrical arcs between the working surface on the ring form and an electrode, with the erosion being of sufficient magnitude to open the pores at the working surface.

15. The process according to claim 14 and further comprising introducing a fluent lubricant into the pores of the ring form.

16. The process according to claim 15 wherein the fluent lubricant is introduced into the pores of the ring form before the ring form is mechanically machined.

17. The process according to claim 14 wherein the electrode is circular.

18. The process according to claim 17 and further comprising effecting rotatic n between the electrode and the ring form while the ring form is eroded along its working surface.

* * * * *